United States Patent [19]
Cooley

[11] Patent Number: 5,752,686
[45] Date of Patent: May 19, 1998

[54] BEVERAGE CONTAINER HOLDER WITH PIVOTING COLLAR

[75] Inventor: Robert Merle Cooley, Waterloo, Iowa

[73] Assignee: Deere & Company, Moline, Ill.

[21] Appl. No.: 564,528

[22] Filed: Nov. 29, 1995

[51] Int. Cl.$^6$ ............................................. A47K 1/08
[52] U.S. Cl. .................... 248/311.2; 248/314; 224/926
[58] Field of Search ................... 248/311.2, 309.1, 248/310, 314, 315, 316.8, 346.01, 346.03, 346.07, 346.11, 346.3; 224/926; 296/37.5, 37.8

[56] References Cited

U.S. PATENT DOCUMENTS

| | | |
|---|---|---|
| 3,532,318 | 10/1970 | Lloyd . |
| 4,721,216 | 1/1988 | Kinder . |
| 4,892,281 | 1/1990 | DiFilippo et al. ................ 248/311.2 |
| 5,102,085 | 4/1992 | Wieczorek et al. . |
| 5,326,064 | 7/1994 | Sapien . |
| 5,328,143 | 7/1994 | Koorey et al. . |
| 5,330,146 | 7/1994 | Spykerman ..................... 248/311.2 |
| 5,445,350 | 8/1995 | Rigsby .......................... 248/311.2 X |
| 5,465,891 | 11/1995 | Bridges . |
| 5,505,417 | 4/1996 | Plocher .......................... 248/311.2 |

FOREIGN PATENT DOCUMENTS

| | | | |
|---|---|---|---|
| 589945 | 6/1925 | France | ................ 248/346.11 |

*Primary Examiner*—Leslie A. Braun
*Assistant Examiner*—Stephen S. Wentsler

[57] ABSTRACT

A container holder assembly includes a housing which forms a generally cylindrical recess and a shelf surface which extends radially outwardly from an upper end of the recess. A sector shaped collar member is pivotally coupled to the housing and is pivotal from a first position wherein it is oriented away from the shelf surface and to a second position wherein it at least partially overlaps the shelf surface. The collar member and the shelf surface form an opening therebetween which is smaller than the upper end of the recess when the collar member is in the first position. The collar has a tab which is received in slots in outer wall which extends around the open end of the recess.

17 Claims, 1 Drawing Sheet

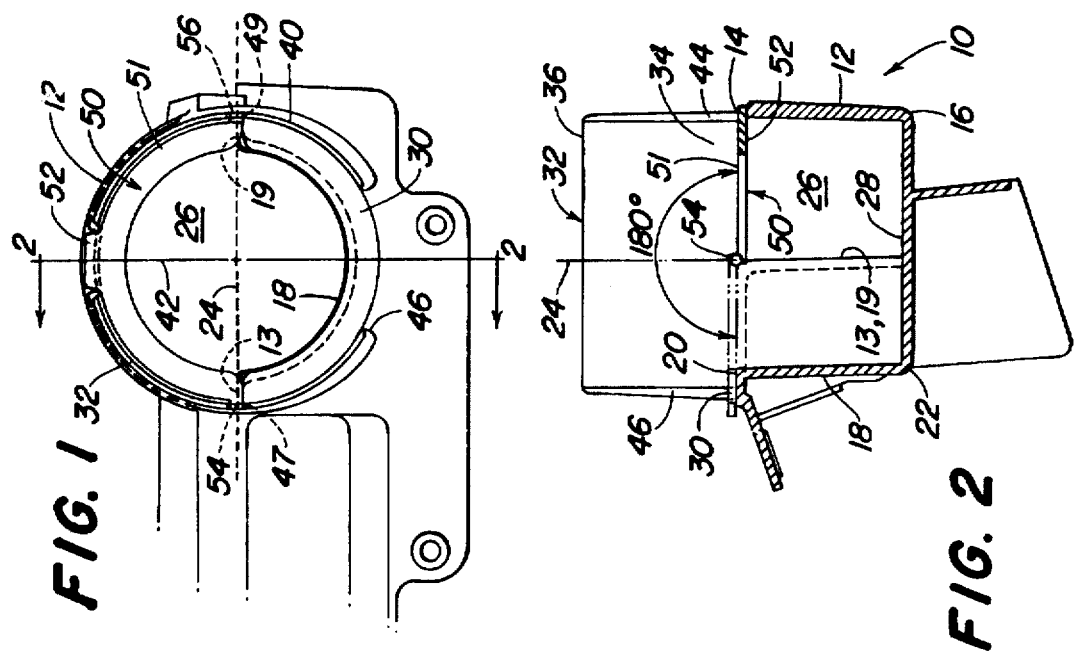
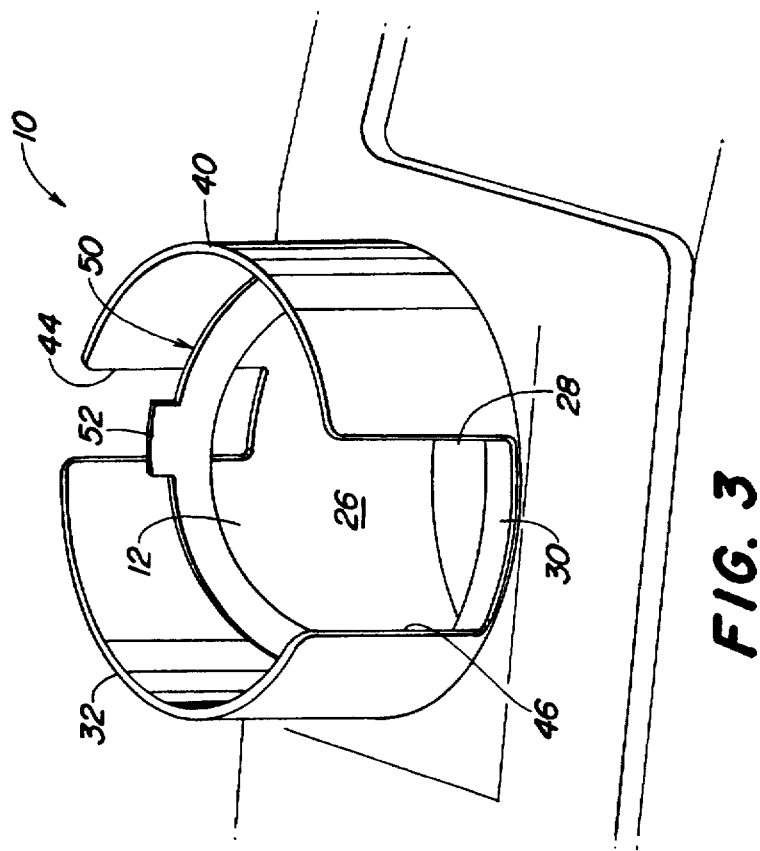

BEVERAGE CONTAINER HOLDER WITH PIVOTING COLLAR

BACKGROUND OF THE INVENTION

The invention relates to a vehicle accessory for receiving and holding items such as beverage containers.

It is desirable to provide a holder for receiving containers of different sizes, such as soft drink cans and bottles and coffee mugs. Various designs have been proposed in attempts to solve this problem. For example, U.S. Pat. No. 5,102,085 shows a container holder which has a hollow cylindrical insert which slides within a cylindrical base. However, when the insert is extended to receive a tall container, the container must fit through a narrower opening in the bottom of the insert. U.S. Pat. No. 5,326,064 and U.S. Pat. No. 4,721,216 both show drink holders with a larger diameter upper section and a smaller diameter lower section. However, with such holders a tall narrow container may be susceptible to tipping because it would be held only at its bottom end. It would be desirable to have a container holder which is simple in construction and which securely accommodates a wide variety of containers.

SUMMARY OF THE INVENTION

Accordingly, an object of this invention is to provide a beverage container holder which can securely and conveniently hold a range of container sizes and types.

These and other objects are achieved by the present invention, wherein a container holder assembly includes a housing which forms a generally cylindrical recess and a shelf surface which extends radially outwardly from an upper end of the recess. A sector shaped collar member is pivotally coupled to the housing and is pivotal from a first position wherein it is oriented away from the shelf surface and to a second position wherein it at least partially overlaps the shelf surface. The collar member and the shelf surface form an opening therebetween which is smaller than the upper end of the recess when the collar member is in the first position. The collar has a tab which is received in slots in an outer wall which extends around the open end of the recess.

BRIEF DESCRIPTION OF THE DRAWINGS

FIG. 1 is a top view of a container holder assembly according to the present invention;

FIG. 2 is a sectional view taken along lines 2—2 of FIG. 1; and

FIG. 3 is a perspective view of a container holder assembly according to the present invention.

DETAILED DESCRIPTION

Referring to the Figures, a holder assembly includes a housing 10 which forms a first larger radius of curvature side wall member 12 having an upper end 14 and a lower end 16, and a second smaller radius of curvature side wall member 18 having an upper end 20 and a lower end 22. The first and second side wall members 12 and 18 are joined together by radially and axially extending walls 13 and 19 along a first plane 24 to form a generally cylindrical recess 26 with an axis parallel to the first plane 24. A bottom wall 28 is joined to the lower ends of the first and second side wall members 12 and 18.

The housing 10 also forms a sector shaped shelf member 30 which is extends radially outwardly and through an angle of approximately 180 degrees from the upper end 20 of the second side wall member 18. The shelf member 30 has an outer radius of curvature which is substantially the same as the radius of curvature of the first side wall 12 and an inner radius of curvature which is substantially the same as the radius of curvature of the second side wall 18.

The housing 10 also forms a partially cylindrical third side wall member 32 which extends substantially axially from a lower end 34 to an upper free end 36. The lower end 34 is joined to an outer edge of the shelf member 30 and to the upper end 14 of the first side wall member 12.

The housing 10 also forms a partially cylindrical fourth side wall member 40 which also extends substantially axially from a lower end to an upper free end. The lower end of the fourth wall member 40 is also joined to an outer edge of the shelf member 30 and to the upper end 14 of the first side wall member 12.

The third and fourth wall members 32, 40 together form a notched curved wall which substantially surrounds the upper end of the recess 26 and in effect, axially extends the recess 26. The third and fourth wall members 32, 40 are spaced apart on opposite sides of a second plane 42 which is perpendicular with respect to the first plane 24. The first, third and fourth wall members form a first slot 44 therebetween, and the shelf member 30 and the third and fourth wall members form a second slot 46 therebetween. The slots 44 and 46 are oriented on opposite sides of the first plane 24. Pivot pin holes 47 and 49 are formed in the housing near the plane of the upper surface of the shelf member 30 and in alignment with the first plane 24. Slot 46 is preferably larger than slot 44 and is oriented so as to conveniently receive a finger ring (not shown) of a beverage mug (not shown).

The holder assembly also includes a sector shaped collar member 50 which is pivotally coupled to the lower ends of the third and fourth wall members 32, 40, or to the upper ends of walls 12 and 18, along a pivot axis which is defined by the holes 47 and 49. The collar member 50 has sector shaped body 51, a tab 52 which projects outwardly from a central part of the body 51 and a pair of pivot pins 54, 56 which project radially outwardly from opposite ends of the body 51 and which are received by the corresponding holes 47 and 49. The collar member body 51 has an inner radius of curvature which is less than the radius of curvature of the first wall member 12 and which is substantially equal to the radius of curvature of the second wall member 18. The collar member body 51 has an outer radius of curvature which is substantially the same as the radius of curvature of the first wall member 12.

The collar member 50 is pivotal to a first position (shown by solid lines in FIG. 2), wherein the tab 52 is received by the first slot 44 and engages the upper end 14 of first wall member 12, and to a second position (shown by dashed lines in FIG. 2), wherein the tab 52 is received by the second slot 46 and engages the upper end shelf member 30.

When the collar member 50 is in its first position the collar member 50 and the shelf member 30 together form a nearly complete annular shelf surface which supports a properly sized mug (not shown) near the top of the holder assembly for easy access thereto by the person using the mug. Also when the collar member 50 is in its first position, the collar member 50 and the shelf member 30 together enclose an opening therebetween which is smaller than the upper end of the recess 26 so as to fit closely around a taller narrower container such as a soft drink bottle (not shown). Preferably, a finger ring (not shown) of a mug can be positioned within the larger slot 46.

When the collar member 50 is in its second position the collar member 50 substantially overlaps the shelf 30 and increased access to the lower part of recess 26 is provided so that a taller beverage container, such as a can or bottle (not shown) may be received by recess 26 and supported by bottom wall 28.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A container holder assembly comprising:

a housing comprising a generally cylindrical housing wall enclosing a recess, the housing wall having a lower first end joined to a bottom surface and an open upper second end, the housing also forming a shelf surface extending radially outwardly from the second end of the housing wall; and a sector shaped collar member pivotally coupled to the housing, the collar member being pivotal from a first position wherein it is oriented away from the shelf surface and to a second position wherein it at least partially overlaps the shelf surface, the collar member and the shelf surface forming an opening therebetween which is smaller than the open second end of the recess when the collar member is in said first position.

2. The container holder assembly of claim 1, wherein:

the housing forms a curved outer wall extending from a lower end to an upper free end, the outer wall lower end being joined to an outer edge of the shelf surface and to the housing wall second end.

3. The container holder assembly of claim 2, wherein:

first and second slots are formed in the outer wall, the first and second slots being oriented on opposite sides of the assembly; and the collar member has a tab which projects outwardly from a central part thereof, the tab being received by the first slot when the collar member is in the first position, and the tab being received by the second slot when the collar member is in the second position.

4. The container holder assembly of claim 1, wherein:

the housing wall forms a first side wall member having an upper end and a lower end, a second side wall member having an upper end and a lower end, the bottom surface being joined to the lower ends of the first and second side wall members, the first and second side wall members being joined together to form the recess, and the first side wall member having a larger radius of curvature than a radius of curvature of the second side wall member.

5. The container holder assembly of claim 4, wherein:

the shelf surface is joined to an upper edge of the second side wall member.

6. The container holder assembly of claim 4, wherein:

the shelf surface has an outer radius of curvature substantially the same as a radius of curvature of the first side wall member.

7. The container holder assembly of claim 4, wherein:

the collar member has an inner radius of curvature which is less than the radius of curvature of the first wall member.

8. The container holder assembly of claim 4, wherein:

the collar member has an outer radius of curvature which is substantially the same as the radius of curvature of the first wall member.

9. A container holder assembly comprising:

a first side wall member having an upper end and a lower end;

a second side wall member having an upper end and a lower end;

a bottom wall joined to the lower ends of the first and second side wall members, the first and second side wall members and the bottom wall being joined together to form a recess;

a sector shaped shelf member attached to and extending radially outwardly from the upper end of the second side wall member; and a sector shaped collar member pivotally coupled to the wall members, the collar member being pivotal from a first position wherein it is oriented towards the first side wall member and to a second position wherein it engages the shelf member.

10. The container holder assembly of claim 9, comprising:

a further side wall member, the further wall member being partially cylindrical and extending substantially axially from a lower end to an upper free end, the further side wall member lower end being joined to an outer edge of the shelf member and to the upper end of the first side wall member;

first and second slots formed in the further wall member, the first and second slots being oriented on opposite sides of the assembly; and the collar member has a tab which projects outwardly from a central part thereof, the tab being received by the first slot and engaging the first wall member when the collar member is in the first position, and the tab being received by the second slot when the collar member is in the second position.

11. The container holder assembly of claim 9, wherein:

the first side wall member has a larger radius of curvature than a radius of curvature of the second side wall member.

12. The container holder assembly of claim 9, the first and second side wall members are joined together along a first plane which is parallel to an axis of the recess.

13. The container holder assembly of claim 12, wherein:

the shelf member has an outer radius of curvature substantially the same as a radius of curvature of the first side wall member.

14. The container holder assembly of claim 9, further comprising:

a third wall, the third wall extending from a lower end to an upper free end, the third wall lower end being joined to an outer edge of the shelf member and to the upper end of the first side wall member.

15. The container holder assembly of claim 14, wherein the third wall comprises:

a first wall part, the first wall part being partially cylindrical and extending substantially axially from a lower end to an upper free end, the first wall part lower end being joined to an outer edge of the shelf member and to the upper end of the first side wall member; and a second wall part, the second wall part being partially cylindrical and extending substantially axially from a lower end to an upper free end, the second wall part lower end being joined to an outer edge of the shelf member and to the upper end of the first side wall member, the first and second wall parts being spaced apart on opposite sides of the assembly, the first wall member and the first and second wall parts forming a first slot therebetween, the second wall member and the first and second wall parts forming a second slot therebetween, the first and second slots being oriented on opposite sides of the assembly.

16. The container holder assembly of claim 15, wherein:

the collar member has a tab which projects outwardly from a central part thereof, the tab being received by the first slot and engaging the first wall member when the collar member is in the first position and the tab being received by the second slot and the second wall member when the collar member is in the second position.

17. A holder assembly comprising:

a first side wall member having an upper end and a lower end;

a second side wall member having an upper end and a lower end, the first and second side wall members being joined together along a first plane to form a generally cylindrical recess with an axis parallel to the first plane, the first side wall member having a radius of curvature which is larger than a radius of curvature of the second side wall member;

a bottom wall joined to the lower ends of the first and second side wall members;

a sector shaped shelf member attached to and extending radially outwardly from the upper end of the second side wall member, the shelf member having an outer radius of curvature substantially the same as the radius of curvature of the first side wall;

a third side wall member, the third wall member being partially cylindrical and extending substantially axially from a lower end to an upper free end, the third side wall member lower end being joined to an outer edge of the shelf member and to the upper end of the first side wall member;

a fourth side wall member, the fourth wall member being partially cylindrical and extending substantially axially from a lower end to an upper free end, the fourth side wall member lower end being joined to an outer edge of the shelf member and to the upper end of the first side wall member, the third and fourth wall members being spaced apart on opposite sides of a second plane which is perpendicular with respect to the first plane, the first, third and fourth wall members forming a first slot therebetween, the second, third and fourth wall members forming a seond slot therebetween, the first and second slots being oriented on opposite sides of the first plane; and a sector shaped collar member pivotally coupled to the wall members along a pivot axis which is parallel to the first plane, the collar member having a tab which projects outwardly from a central part thereof, the collar member being pivotal from a first position wherein the tab is received by the first slot and engages the first wall member to a second position wherein the tab is received by the second slot and engages the second wall member.

* * * * *

UNITED STATES PATENT AND TRADEMARK OFFICE
CERTIFICATE OF CORRECTION

PATENT NO. : 5,752,686
DATED : May 19, 1998
INVENTOR(S) : Robert M. Cooley

It is certified that error appears in the above-indentified patent and that said Letters Patent is hereby corrected as shown below:

Column 4, line 28 delete "Joined" and insert --joined--.

Column 6, line 20 delete "seond" and insert --second--.

Signed and Sealed this

First Day of December, 1998

*Attest:*

BRUCE LEHMAN

*Attesting Officer*       *Commissioner of Patents and Trademarks*